Patented Mar. 21, 1950

2,501,625

UNITED STATES PATENT OFFICE 2,501,625

METHYLATION OF ISOPARAFFINS IN THE PRESENCE OF HYDROGEN FLUORIDE

Robert E. Woodward, Belleville, Ill., assignor to Socony-Vacuum Oil Company, Incorporated, a corporation of New York No Drawing. Application September 11, 1946, Serial No. 696,363

18 Claims. (Cl. 260—683.4)

This invention relates to a process for the methylation of isoparaffins by reaction with methyl halides in the presence of hydrogen fluoride.

Alkylation of hydrocarbons of both the paraffin and aromatic series is accomplished with reasonable ease when the alkyl group to be introduced contains more than one carbon atom. Thus, at temperatures and pressures well within the reach of present commercial equipment both normal and isoparaffins react with many olefins in the absence of catalysts to form higher boiling paraffinic hydrocarbons. At lower temperatures and pressures the isoparaffins react with olefins quite readily in the presence of such catalysts as aluminum chloride, sulfuric acid, hydrogen fluoride and the like. The aromatic hydrocarbons react with olefins to form alkyl aromatics even more readily than do the isoparaffins.

The classic work of Friedel and Crafts demonstrated the possibility of alkylating aromatics in the presence of suitable catalysts with alkyl halides. In spite of the large amount of work which has been expended on various types of alkylation reactions, the substitution of methyl groups in aliphatic hydrocarbons has been found extremely difficult. Introduction of methyl groups to paraffin hydrocarbons by direct alkylation was reported only recently. Thus, U. S. Patent No. 2,255,843 describes catalytic methylation in the presence of aluminum chloride. Catalytic methylation of aromatic hydrocarbons with methyl chloride in the presence of aluminum chloride was described by Friedel and Crafts in 1887.

With the recognition that hydrogen fluoride is an active alkylation catalyst, attempts have been made to apply this catalyst to various types of alkylation reactions. Simons and Passino (J. A. C. S. 62, 1624) have described attempts to alkylate aromatic compounds with methyl halides in the presence of hydrogen fluoride. It was found that methyl iodide, methyl alcohol and methyl acetate failed to alkylate benzene, toluene or phenol in the presence of hydrogen fluoride. Since the aromatic hydrocarbons are generally recognized as more amenable to alkylation than are the paraffin hydrocarbons, it is to be expected that the paraffin hydrocarbons would also fail to react.

Contrary to this expectation, it has now been found that the methyl halides will alkylate isoparaffin hydrocarbons in the presence of hydrogen fluoride. Elevated temperatures and pressures favor the reaction and it is preferred that the reaction be conducted at temperatures of at least about 200° F. and pressures of at least 500 pounds per square inch. Relatively high yields of the methyl derivative are to be obtained at still higher temperatures and pressures on the order of 350° F. and 3000 pounds per square inch and above.

The alkylation of isoparaffins with higher alkyl groups in the presence of hydrogen fluoride normally results in substitution of the alkyl group at the tertiary carbon atom. Contrary to this behavior, I have found that the methylation with methyl halides in the presence of hydrogen fluoride generally results in a preponderance of substitution at terminal carbon atoms. From this it might be expected that the normal paraffins will react as do the isoparaffins in the present process since the tertiary carbon atom is not necessarily directly involved in the alkylation reaction. Such, however, is not the case. Attempts to methylate normal paraffins under conditions which give very good results with isoparaffins, result in a very small amount of high boiling material but no mono-methyl derivative can be detected therein. This is similar to the results obtained in runs made to check the conclusions of Simons and Passino cited above wherein it was attempted to react benzene and methyl chloride at high pressures and temperatures in the presence of hydrogen fluoride. Although a small amount of high boiling material was recovered, no toluene was detected therein.

It would appear that the present reaction is unique in the alkylation field. Normally, the catalytic alkylation of various hydrocarbons proceeds with increasing difficulty in the series aromatic hydrocarbon, isoparaffin, and normal paraffin. In the present case the reaction proceeds satisfactorily with isoparaffins but it has not been found possible to conduct a similar methylation of either aromatic or normal paraffinic hydrocarbons.

It is, therefore, a primary object of the invention to form methyl derivatives of isoparaffins by reaction of isoparaffins with methyl halides in the presence of hydrogen fluoride as a catalyst. The invention contemplates the synthesis of various hydrocarbons and the formation of higher boiling hydrocarbons having high anti-knock values and other valuable properties from lower boiling isoparaffins.

*Example 1*

The 2000 cc. bomb was charged with 500 grams of hydrogen fluoride, 220 grams of methyl chloride and 310 grams of isopentane. The bomb was maintained for three hours at 478° F. and 4200 pounds per square inch pressure while agitating the mixture by shaking the bomb. The reaction mixture was cooled and settled to separate hydrogen fluoride and was then distilled to obtain a yield of 52.8 grams of alkylate boiling at temperatures above the boiling points of the reactants. Fractional distillation of the alkylate showed that the same contained 67.4% of hexanes.

*Example 2*

The reaction may also be conducted in a continuous manner by the use of a coil reactor through which a mixture of reactants and catalyst is pumped under the desired temperature and pressure for reaction. An apparatus of that type was supplied over a period of 43 minutes with 383 grams of hydrogen fluoride, 211 grams of methyl chloride and 1136 grams of isopentane while maintaining the temperature at 350° F. and a pressure at 4000 pounds per square inch. The reactor volume was 550 cc. and the effective reaction time was approximately 0.17 hour. A product yield of 212 grams of alkylate was recovered and distilled on a 35 plate column at a reflux ratio of 25 to 1. Analysis of the product fractions by infra red spectra showed the following constituents in the material boiling above 44° C.

| | Per cent |
|---|---|
| Pentanes | 0.9 |
| 2,2-dimethyl butane | 2.6 |
| 2,3-dimethyl butane | 8.6 |
| 2-methyl pentane | 30.4 |
| 3-methyl pentane | 24.1 |
| Normal hexane | 8.2 |
| 2,2,3-trimethyl butane | 0.1 |
| 2,2-dimethyl pentane | 0.4 |
| 2,3-dimethyl pentane | 1.3 |
| 2,4-dimethyl pentane | 2.0 |
| 2-methyl hexane | 4.7 |
| 3-methyl hexane | 4.6 |
| Higher boiling material | 12.1 |

*Example 3*

A charge containing 310 grams of isopentane, 207 grams of methyl chloride and 520 grams of anhydrous hydrogen fluoride was agitated for 55 minutes in a stirring autoclave at 140° F. and up to 218 pounds per square inch. Distillation of the product showed 3 cc. of material boiilng above 43° C.

*Example 4*

Using the same reactor as in Example 2, a charge consisting of 142 grams of hydrogen fluoride, 280 grams of methyl chloride, and 1190 grams of isopentane was pumped through the reactor at 503° F. and 3000 pounds per square inch over a period of 46 minutes. The residence time was estimated as 0.07 hour. A yield of 21.3 grams of alkylate boiling above 44° C. was shown by distillation.

*Example 5*

A charge consisting of 187 grams of hydrogen fluoride, 26 grams of methyl chloride and 100 grams of 2,3-dimethyl butane was stirred in an autoclave at 335° F. and 600 pounds per square inch. A yield of 13.8 grams of alkylate boiling above 76° C. was obtained, of which 38% boiled in the heptane range.

*Example 6*

179 grams of methyl chloride and 902 grams of isopentane were charged to the coil reactor with 409 grams of hydrogen fluoride over a period of 33 minutes. The reactor was maintained at 360° F. and 4000 pounds per square inch, giving 87 grams of alkylate containing 70% of hexanes.

*Example 7*

An attempt was made to alkylate normal pentane under conditions similar to those of the preceding example. The charge was made up of 217 grams of methyl chloride, 1105 grams normal pentane and 472 grams of hydrogen fluoride. The reactor was maintained at 350° F. and 4000 pounds per square inch over a charging time of 43 minutes. A small amount of high boiling material was obtained but it contained no detectable hexane.

*Example 8*

Another similar run was made in an attempt to alkylate benzene at 350° F. and 4000 pounds per square inch. The charge was made up of 207 grams of methyl chloride, 1115 grams of benzene and 360 grams of hydrogen fluoride. The charging time was 39 minutes. Here again a small amount of high boiling material was obtained but it had no toluene content.

I claim:

1. A process for methylating isoparaffins predominantly at the terminal carbon atoms thereof which comprises reacting a methyl halide with an isoparaffin in the presence of a catalyst consisting essentially of hydrogen fluoride.

2. A process for methylating isopentane predominantly at the terminal carbon atoms thereof which comprises reacting isopentane with a methyl halide in the presence of a catalyst consisting essentially of hydrogen fluoride.

3. A process for methylating isohexane predominantly at the terminal carbon atoms thereof which comprises reacting isohexane with a methyl halide in the presence of a catalyst consisting essentially of hydrogen fluoride.

4. A process for methylating isoparaffins predominantly at the terminal carbon atoms thereof which comprises reacting methyl chloride with an isoparaffin in the presence of a catalyst consisting essentially of hydrogen fluoride.

5. A process for methylating isopentane predominantly at the terminal carbon atoms thereof which comprises reacting isopentane with methyl chloride in the presence of a catalyst consisting essentially of hydrogen fluoride.

6. A process for methylating isohexane predominantly at the terminal carbon atoms thereof which comprises reacting isohexane with methyl chloride in the presence of a catalyst consisting essentially of hydrogen fluoride.

7. A process for methylating isoparaffins predominantly at the terminal carbon atoms thereof which comprises reacting a methyl halide with an isoparaffin in the presence of a catalyst consisting essentially of hydrogen fluoride at a temperature of at least about 200° F. and a pressure of at least about 500 pounds per square inch.

8. A process for methylating isopentane predominantly at the terminal carbon atoms thereof which comprises reacting isopentane with a methyl halide in the presence of a catalyst consisting essentially of hydrogen fluoride at a temperature of at least about 200° F. and a pressure of at least about 500 pounds per square inch.

9. A process for methylating isohexane predominantly at the terminal carbon atoms thereof which comprises reacting isohexane with a methyl halide in the presence of a catalyst consisting essentially of hydrogen fluoride at a temperature of at least about 200° F. and a pressure of at least about 500 pounds per square inch.

10. A process for methylating isoparaffins predominantly at the terminal carbon atoms thereof which comprises reacting methyl chloride with an isoparaffin in the presence of a catalyst consisting essentially of hydrogen fluoride at a temperature of at least about 200° F. and a pressure of at least about 500 pounds per square inch.

11. A process for methylating isopentane predominantly at the terminal carbon atoms thereof which comprises reacting isopentane with methyl chloride in the presence of a catalyst consisting essentially of hydrogen fluoride at a temperature of at least about 200° F. and a pressure of at least about 500 pounds per square inch.

12. A process for methylating isohexane predominantly at the terminal carbon atoms thereof which comprises reacting isohexane with methyl chloride in the presence of a catalyst consisting essentially of hydrogen fluoride at a temperature of at least about 200° F. and a pressure of at least about 500 pounds per square inch.

13. A process for methylating isoparaffins predominantly at the terminal carbon atoms thereof which comprises reacting a methyl halide with an isoparaffin in the presence of a catalyst consisting essentially of hydrogen fluoride at a temperature of at least about 350° F. and a pressure of at least about 3000 pounds per square inch.

14. A process for methylating isopentane predominantly at the terminal carbon atoms thereof which comprises reacting isopentane with a methyl halide in the presence of a catalyst consisting essentially of hydrogen fluoride at a temperature of at least about 350° F. and a pressure of at least about 3000 pounds per square inch.

15. A process for methylating isohexane predominantly at the terminal carbon atoms thereof which comprises reacting isohexane with a methyl halide in the presence of a catalyst consisting essentially of hydrogen fluoride at a temperature of at least about 350° F. and a pressure of at least about 3000 pounds per square inch.

16. A process for methylating isoparaffins predominantly at the terminal carbon atoms thereof which comprises reacting methyl chloride with an isoparaffin in the presence of a catalyst consisting essentially of hydrogen fluoride at a temperature of at least about 350° F. and a pressure of at least about 3000 pounds per square inch.

17. A process for methylating isopentane predominantly at the terminal carbon atoms thereof which comprises reacting isopentane with methyl chloride in the presence of a catalyst consisting essentially of hydrogen fluoride at a temperature of at least about 350° F. and a pressure of at least about 3000 pounds per square inch.

18. A process for methylating isohexane predominantly at the terminal carbon atoms thereof which comprises reacting isohexane with methyl chloride in the presence of a catalyst consisting essentially of hydrogen fluoride at a temperature of at least about 350° F. and a pressure of at least about 3000 pounds per square inch.

ROBERT E. WOODWARD.

REFERENCES CITED

The following references are of record in the file of this patent:

UNITED STATES PATENTS

| Number | Name | Date |
| --- | --- | --- |
| 2,255,843 | Carmody et al. | Sept. 16, 1941 |
| 2,307,773 | Egloff | Jan. 12, 1943 |
| 2,307,799 | Linn | Jan. 12, 1943 |
| 2,320,629 | Matuszak | June 1, 1943 |
| 2,387,162 | Matuszak | Oct. 16, 1945 |

OTHER REFERENCES

Simons: "Potential Use of Hydrogen Fluoride in Organic Chemical Processes," Industrial and Engineering Chemistry, Feb. 1940, page 181.